July 6, 1943. H. DOMRESE ET AL 2,323,460
ROTARY SUBSOILER
Filed May 2, 1941 2 Sheets-Sheet 2
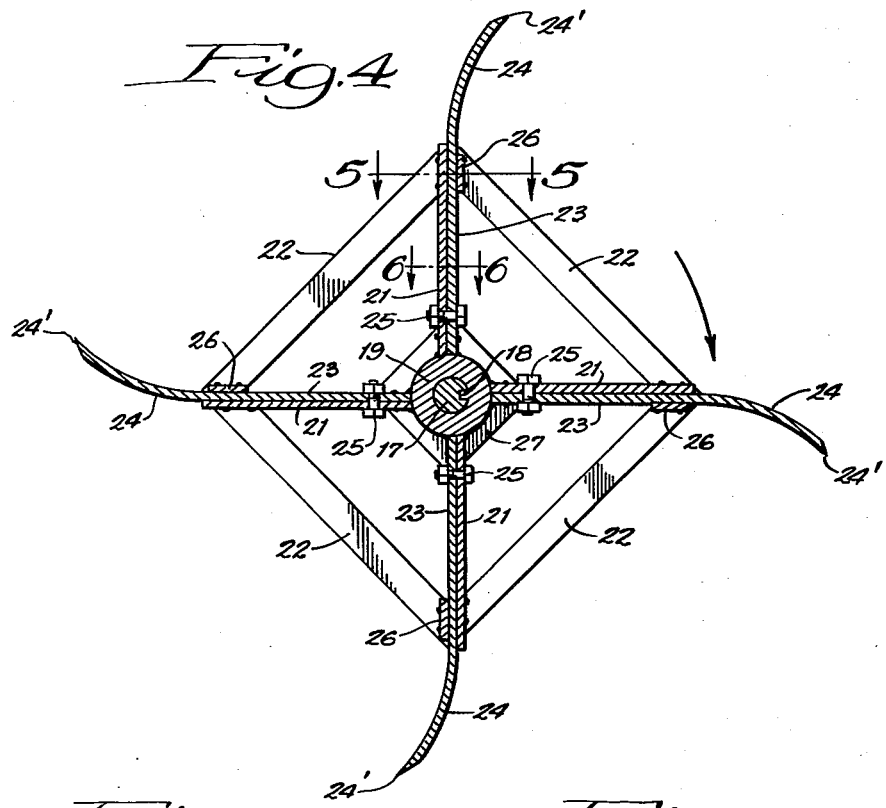
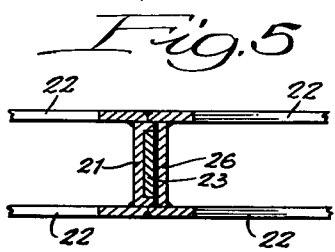 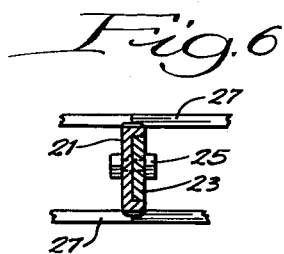
Inventors:
Henry Domrese,
Claude C. Catkins and
Laurence A. Hunt,
By Soans, Pond & Anderson,
Attorneys.

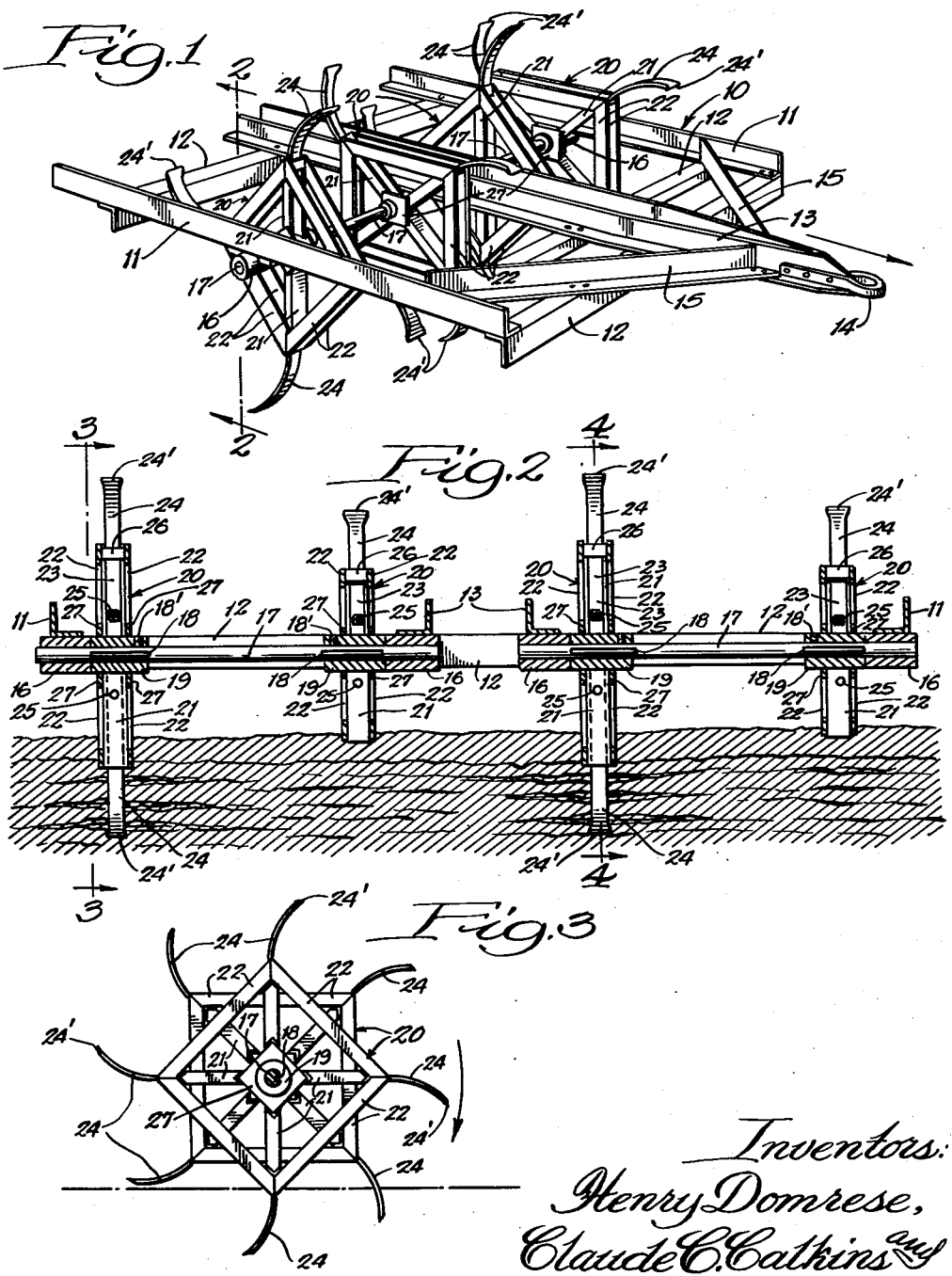
July 6, 1943.   H. DOMRESE ET AL   2,323,460
ROTARY SUBSOILER
Filed May 2, 1941   2 Sheets-Sheet 1
Inventors:
Henry Domrese,
Claude C. Catkins and
Laurence A. Hunt,
By Soans Pond & Anderson,
Attorneys.

Patented July 6, 1943

2,323,460

UNITED STATES PATENT OFFICE 2,323,460

ROTARY SUBSOILER

Henry Domrese, Waterville, and Claude C. Calkins and Laurence A. Hunt, Spokane, Wash., assignors to Calkins Manufacturing Company, a corporation of Washington Application May 2, 1941, Serial No. 391,448

3 Claims. (Cl. 97—52)

This invention relates to an agricultural ground working implement, somewhat resembling a rotary toothed harrow, but having, as we believe, a novel function and use, which is to promote soil conservation by greatly increasing the amount of moisture resulting from rainfall, snow, etc., that penetrates the subsoil. So far as we are aware, rotary harrows break up the surface soil to the average depth of an ordinary plow, but do not penetrate and break up the subsoil. The primary purpose of the implement forming the subject-matter of this invention is to deeply penetrate and break up the hard subsoil constituting what is known as the "plow pan" or hard soil that is just beneath the depth usually penetrated by the average plow, so that the moisture of rain, snow and frost will readily penetrate the subsoil and be utilized in the latter to withstand periods of drought. A further object of the invention is to provide an implement well adapted to prevent the soil from sluffing or running off or being washed away on hillsides. In certain areas the ground freezes in the winter and then thaws on the surface in the spring, and naturally moisture on top runs across the surface, not being able to penetrate the subsoil, and washes the land away with it. Again, in other areas, the rainfall may be heavy and fall so fast that it washes across the surface of the soil, instead of penetrating it, thus carrying the soil with it. As a result of this, little ditches and rivulets are formed by the water, and this water usually carries with it in addition to the surface soil much of the valuable plant food which is in the soil, accounting in some instances for the loss of enough plant food in a single winter to raise several crops.

The implement of our present invention is very simple, and comprises mainly a suitable horizontal frame equipped with a central draft bar for attachment to a tractor, a transverse shaft journaled in and crosswise of the frame, and a plurality of heavy wheel frames mounted in laterally spaced relation on said shaft and each equipped with a plurality of generally radial narrow shovels equally spaced around the periphery of the wheel frame and projecting several feet beyond said periphery and preferably curved, so that, as the implement is drawn over the ground, the shovels will successively penetrate the ground to the full depth permitted by the periphery of the frames, thus forming deep holes in and through the subsoil, and then, as the shovel emerges from the subsoil, will fracture and loosen up the latter widely on both sides, and lift but a small portion of the subsoil to the surface. In practice, the frame of the implement is heavily weighted, as by sandbags, so as to insure deep penetration by the shovels.

One form of implement which in actual practice has been found to satisfactorily effectuate the purposes and objects of the invention is illustrated in the accompanying drawings, in which—

Fig. 1 is a perspective view of the subsoiler;

Fig. 2 is a vertical section taken on the line 2—2 of Fig. 1;

Fig. 3 is a side elevation of a pair of relatively staggered diggers, in section through the shaft on the line 3—3 of Fig. 2;

Fig. 4 is an enlarged vertical section taken on the line 4—4 of Fig. 2, more particularly illustrating the means for mounting the shovel shanks in the radial spokes of the wheel frames; and Figs. 5 and 6 are sectional details taken on the lines 5—5 and 6—6 of Fig. 4.

The implement comprises a rectangular horizontal frame designated as an entirety by 10, which may conveniently be made up of a pair of longitudinal side bars 11 and transverse bars 12 rigidly connecting and spacing the longitudinal side bars 11. As shown, all of these bars may conveniently consist of angles bolted or riveted together at their intersections. 13 designates a central longitudinal draft bar, also preferably composed of a pair of angles tapering toward each other at their front ends, to which a suitable clevis 14 is secured for connection to a tractor. The front portion of the draft bar is preferably braced to the side bars 11 by a pair of angles 15, and the draft bar 13 is, of course, riveted, bolted, or otherwise strongly secured to and crosswise of the transverse frame bars 12.

To the undersides of the frame bars 11 and the angles of the draft bar 13 are secured bearings 16, in which are journaled in alinement with each other, a pair of shaft sections 17. Nonrotatable on each shaft section, as by splines 18, are the hubs 19 of a pair of rectangular wheel frames, each designated as an entirety by 20, the hubs 19 being locked against endwise shift by set screws 18'. These wheel frames may be made as castings within the purview of the invention, but preferably they are fabricated as follows.

21 designates each of four spokes that extend radially from the hub 19 ninety degrees apart, these spokes preferably being of channel cross-section. The outer ends of the four spokes 21 are rigidly connected and spaced on both sides by straight flat bars 22 that meet in miter joints at the outer ends of the spokes, being spot-welded or otherwise attached to the latter. Seated within each channel spoke the straight shank portion 23 (Fig. 4) of a long, narrow shovel, the earth-engaging projecting portion 24 of which is preferably forwardly curved as shown in the direction of rotation, and formed with a slightly widened and sharpened free end 24'. The shank 23 is secured near its inner end to the web of the channel by a bolt 25, and at its outer portion is confined within the channel by a keeper 26 (Fig. 5) spot-welded or otherwise secured to the side flanges of the channels directly across the shanks 23, as best shown in Fig. 5. These attachments strongly secure the shovels in the wheel frame against either pulling out or shifting laterally. The inner ends of the spokes 21 are secured to the corners of a pair of rectangular plates 27 that encircle and are keyed on the hub 19 and are drivingly connected to the four spokes. Such connection may be made by interfitting the corners of the plates into recesses in the sides of the spokes, as indicated in Figs. 3 and 6, or by bolting or welding the corners to the sides of the spokes.

The implement herein illustrated is equipped with two independent shaft sections 17 and two diggers on each section; the four diggers being equally spaced widthwise with the frame, and the shovels of the four diggers being staggered as shown in Figs. 1 and 3, so that the projecting shovels of each digger lie midway in the direction of rotation between the projecting shovels of a laterally adjacent digger. Of course, the number of shaft sections and the number of diggers on each shaft section may be varied as desired.

The main advantage in curving the earth-engaging portions of the shovels lies in the fact that it causes the shovel to penetrate the ground more nearly endwise, rather than sidewise as would be the case if the earth-engaging projections were straight continuations of the shank portions, so that the shovels present less frictional resistance to penetration and the bending strain on the shovel is less than if it were straight, and less tractive power is required. Obviously, each digger might be equipped with five, six or more equally spaced shovels, but experiments have shown that four shovels spaced ninety degrees apart are ample, especially when the shovels of adjacent diggers are relatively staggered, to secure the results aimed at; and, of course, the greater the number of shovels on each digger, the greater is the amount of power required to drag the implement over the ground to be worked. As shown in Fig. 3, with four shovels on each wheel frame, each shovel begins to penetrate the ground just about the time the preceding shovel is emerging from the ground. The gang of diggers rolls over the surface of the ground on the corners of the wheel frames, which, if the frame of the machine is adequately weighted, insures full penetration of each shovel, as shown in Fig. 3. The emerging movement of each shovel involves a combined bodily and tilting movement, and this has the effect of cracking and fracturing the subsoil for a considerable distance laterally of each edge of the shovel, somewhat as is indicated in Fig. 2; and the cracks or fissures thus created permit moisture to readily penetrate the subsoil not only at the grooves or channels cut by the shovels but also for a considerable distance laterally of such grooves or channels. The shovels, being narrow, bring but little of the subsoil to the surface of the ground.

In our tests of this ground-working tool, we have tried the experiment of pivoting the shovels at the corners of the wheel frame so that they can oscillate in the plane of the latter to afford endwise penetration, limiting the oscillating movement by suitable stops. We found, however, that this affords too much chance for dirt, weeds and trash to get into and clog the pivots of the shovels for it to be very practical, and the curved shovel has worked out satisfactorily enough to warrant making the shovel solid or rigid, and is preferred.

The shovels do raise enough dirt to the surface to cover the holes formed by them; and this has an advantage that, if the holes were left open, when freezing weather came the entire exposed area of the hole would be frozen so that the water could not penetrate; whereas, when the area of the hole is covered so that it does not freeze, the dirt forming the wall of the hole is unfrozen so that water can penetrate the soil as above described, and thus build up a supply of moisture in the subsoil.

Tests made by us in the field to determine whether or not water actually penetrated the ground better where this tool was used than where it was not used have shown that on an area where the tool had been used the moisture was down 44 inches, as compared to 17 inches on an adjacent area of ground where the tool was not used. This is believed to be due to the fracturing and lifting action of the shovels on the subsoil as they emerge from their point of deepest penetration, since, as the soil sinks back it is still loose and readily capable of absorbing moisture.

Variations and modifications of the structural details may be resorted to within the purview of the invention as defined in the following claims.

We claim:

1. A subsoil working implement of the character described, comprising, in combination, a substantially horizontal frame, a shaft journaled on and crosswise of said frame substantially midlength thereof, a plurality of laterally spaced diggers on said shaft, said diggers including polygonal wheel frames fast on said shaft in rolling contact with the ground and radially extending narrow shovels attached to and projecting beyond the peripheral corners of said frames, the projecting portions of said shovels being concave lengthwise in their direction of forward rotation and of sufficient length to penetrate the subsoil whereby they exert a lifting and lateral fracturing action on the subsoil as they emerge from the latter, said polygonal wheel frames being formed with radial spokes extending to the corners of the periphery thereof and having the shanks of said shovels bolted to said spokes and extending through said corners, and a central shaft beam secured to and lengthwise of said frame.

2. A subsoil working implement of the character described, comprising, in combination, a substantially horizontal frame, a shaft journaled on and crosswise of said frame substantially midlength thereof, a plurality of laterally spaced diggers on said shaft, said diggers including polygonal wheel frames fast on said shaft in rolling contact with the ground and radially extending narrow shovels attached to and projecting beyond the peripheral corners of said frames, the projecting portions of said shovels being concave lengthwise in their direction of forward rotation and of sufficient length to penetrate the subsoil whereby they exert a lifting and lateral fracturing action on the subsoil as they emerge from the latter, said polygonal wheel frames comprising fabricated radial channel spokes extending to the periphery thereof and having the shanks of said shovels lying within and bolted to said spokes and extending through the corners of said wheel, and a central shaft beam secured to and lengthwise of said frame.

3. A subsoil working implement of the character described, comprising, in combination, a substantially horizontal frame, a shaft journaled on and crosswise of said frame substantially midlength thereof, a plurality of laterally spaced diggers on said shaft, said diggers including polygonal wheel frames fast on said shaft in rolling contact with the ground and radially extending narrow shovels attached to and projecting beyond the peripheral corners of said frames, the projecting portions of said shovels being concave lengthwise in their direction of forward rotation and of sufficient length to penetrate the subsoil whereby they exert a lifting and lateral fracturing action on the subsoil as they emerge from the latter, said polygonal wheel frames comprising fabricated radial channel spokes extending to the corners of the periphery thereof and having the shanks of said shovels lying within and bolted to said spokes and extending through the corners of said wheel frame, the outer end portions of said shanks being confined by keepers secured to and between the sides of said channel spokes, and a central shaft beam secured to and lengthwise of said frame.

HENRY DOMRESE.
CLAUDE C. CALKINS.
LAURENCE A. HUNT.